June 17, 1952  J. H. ANDRESEN, JR  2,600,828
AIR MILES RECORDER AND FOLLOW-UP SYSTEM
Filed March 26, 1946
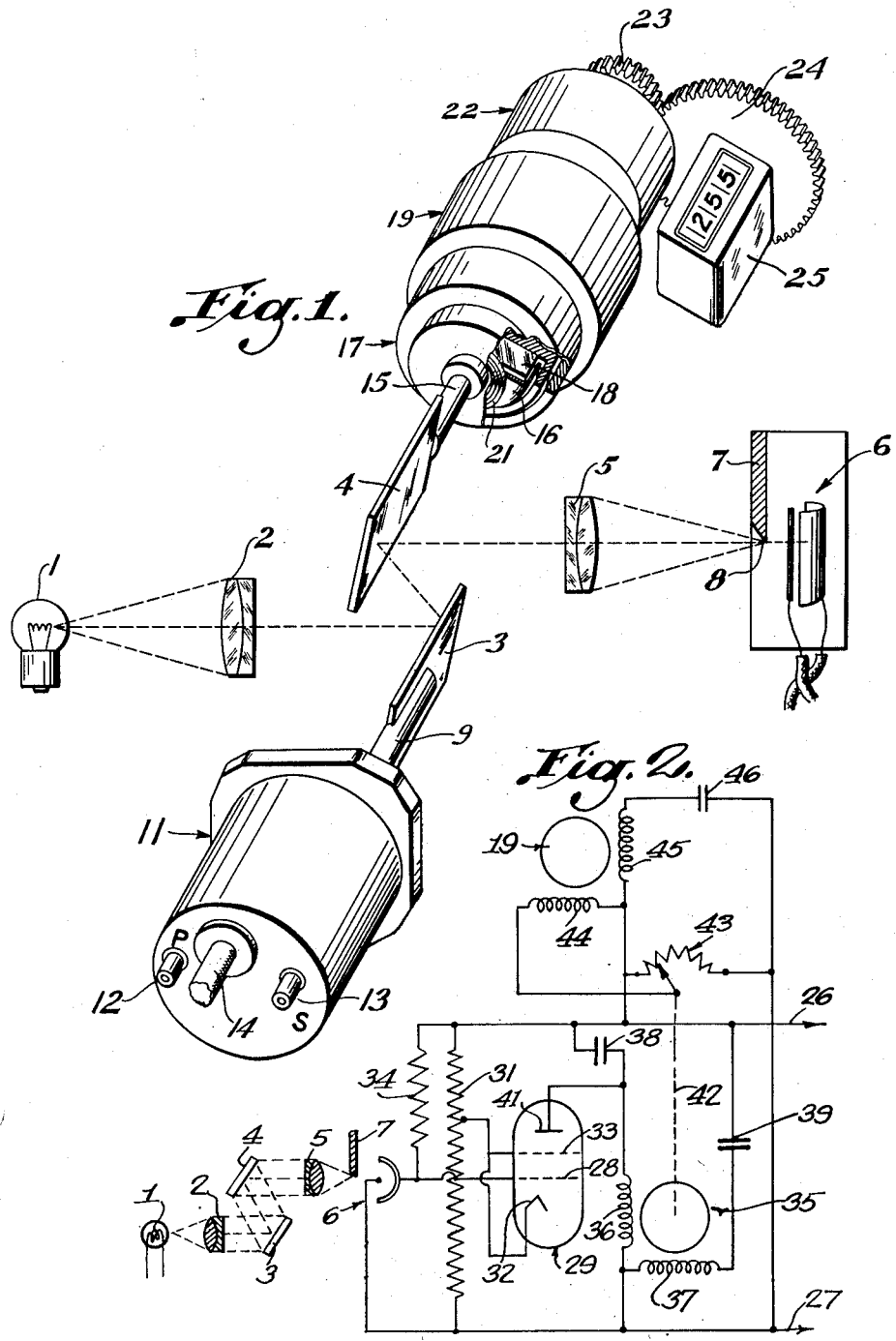
INVENTOR
JOHN H. ANDRESEN jr.
BY
ATTORNEY Patented June 17, 1952

2,600,828

UNITED STATES PATENT OFFICE 2,600,828

AIR MILES RECORDER AND FOLLOW-UP SYSTEM

John H. Andresen, Jr., Port Washington, N. Y., assignor, by mesne assignments to Kollsman Instrument Corporation, Elmhurst, N. Y., a corporation of New York Application March 26, 1946, Serial No. 657,190

13 Claims. (Cl. 73—183)

This invention relates specifically to an aircraft recorder of air miles traveled employing an optical follow-up system controlling the speed of a variable speed motor in response to the operation of an airspeed indicator, the recorder integrating airspeed with time to register the air miles traveled.

Generally the invention relates to an optical follow-up system of general application where it is desired to produce a follower movement in response to change of position of an actuated element.

Also generally the invention relates to an air miles recorder in which means responsive to airspeed controls the speed of a variable speed motor to integrate speed with time regardless of the specific form of the follow-up system used.

An object of the invention is to provide an optical follow-up system in which light rays are directed upon a light sensitive element through a pair of reflecting mirrors with one of the mirrors varying its position and with the second mirror following the position of the first mirror to maintain the light rays at the desired point with respect to the light sensitive element.

Another object of the invention is to provide an optical follow-up system in which the light rays are directed upon a light sensitive element in which the light source and sensitive element are stationary and the mirrors movable, with the movement of one mirror following the movement of the other mirror to maintain the direction of the light rays upon the light sensitive element.

Another object of the invention is to provide an optical follow-up system in which light rays are directed to a light sensitive element through a system including a pair of movable mirrors with one mirror movable in response to an external condition and with the operation of the follow-up system properly moving the second mirror to follow the movement of the first mirror in accordance with variation in the exterior condition.

Another object of the invention is to provide an aircraft air miles recorder utilizing a follow-up system in accordance with the preceding objects with the first or operated mirror moved by an airspeed indicator.

Another object of the invention is to provide an aircraft air miles recorder in accordance with the preceding objects in which the movement of the follower mirror is responsive to the speed of rotation of a variable speed motor connected to a counter indicating the mileage traveled.

Another object of the invention is the provision of an aircraft air miles recorder in which means responsive to airspeed controls the speed of rotation of a variable speed motor connected to a counter for registering air miles traveled.

Another object of the invention is the provision of an aircraft air miles recorder having a first element movable in response to the operation of an airspeed indicator and a second element cooperable therewith to follow the movement thereof with the position of the second element controlled by the speed of rotation of a variable speed motor connected to a counter registering air miles traveled, the speed of rotation of the motor being controlled in accordance with the position of the first element.

Other objects and features of the invention will be readily apparent to those skilled in the art from the specification and appended drawings illustrating certain preferred embodiments in which:

Figure 1 is a schematic representation of the air miles recorder according to the present invention employing the novel form of optical follow-up system.

Figure 2 is a schematic wiring diagram of the recorder and system.

As specifically illustrated in the drawing, the combined arrangement includes a light source 1, the light rays from which are collimated by a lens 2 and directed to a mirror 3 from which they are reflected to a second mirror 4 and thence to a lens 5 focusing the rays upon a photoelectric cell unit 6. In front of the light sensitive photoelectric cell unit 6 is disposed a shield 7 impervious to light and providing a light ray cut-off point indicated at 8.

The mirror 3, which is the operating mirror of the follow-up system, is mounted upon the shaft 9 of a true airspeed indicator 11 of conventional form having pressure connection 12 and static connection 13 to an aircraft Pitot static tube and a thermometer connection 14. This true airspeed indicator is of well known construction and for the ordinary staff and pointer there has been substituted the shaft 9 which carries the mirror 3.

The follower mirror 4 is mounted upon a shaft 15 upon which is mounted the drag cup 16 of a drag cup tachometer indicated at 17. The drag cup tachometer includes permanent magnet elements 18 driven by a variable speed motor 19. The shaft 15 of the drag cup tachometer is biased against rotation by a spring 21 and, in accordance with the well known principles of such tachometers, the arc of rotation of the shaft 15 will be determined by the speed of rotation of the motor 19 and the magnetic elements 13 driven thereby. The motor 19 also drives a system of reducing gears indicated at 22 and connected through gear wheels 23 and 24 to a counter or register 25 indicating the air miles traveled.

In the schematic representation of the wiring diagram for the system illustrated in Figure 2, there is shown an alternating current source indicated by the lines 26 and 27. The line 27 is connected to the anode of the photoelectric unit 6, the cathode of which is connected to the control grid 28 of an electronic tube 29. Across the supply wires 26 and 27 is disposed a voltage dividing resistor 31 and connected to a point thereon toward the line 26 side of the mid point are the cathode 32 and suppressor grid 33 of the electronic tube 29. A grid bias resistor 34 is connected between the grid 28 and the line 26. There is provided a reversible motor indicated at 35 energized by a two phase winding one of which is shown at 36, the other at 37, the winding 36 being fed through a condenser 38 and the winding 37 through a condenser 39. The anode 41 of the tube 29 is connected to bypass the condenser 38.

The operation of the motor reversing circuit is described and claimed in applicant's co-pending application Serial No. 644,136 filed January 29, 1946, which matured into Patent No. 2,437,064, March 2, 1948, entitled Motor Control. When the tube 29 is not firing, the motor 35 operates in a direction determined by the values of the condensers 38 and 39, the condenser 39 having a greater capacity so that the current in the winding 36 leads that in the winding 37. When, however, the tube 29 is firing, it provides a substantially resistive circuit feeding the winding 36 so that the current in winding 36 will follow that in the winding 37 while the tube is conducting to reverse the direction of the motor 35.

The motor 35 is connected through a suitable mechanical connection indicated by the dotted line 42 to a variable rheostat 43 connected in series with one of the two phase windings 44 of the motor 19, the other winding 45 of which is fed through condenser 46. The speed of rotation of the motor 19 is thus determined by the position of the rheostat 43 which is in turn controlled by the motor 35 which rotates in opposite directions to increase or decrease the resistive value of the rheostat.

With the elements of the optical system, including the cut-off point 8 of the photoelectric cell, all at the same level, the mirrors 3 and 4 will be parallel when the image of the light source 1 is at the cut-off point 8 and a linear follow-up response will be obtained. These positions may, of course, be varied as desired within the contemplation of the invention to secure any desired responsive relation.

In the operation of the system let it be assumed that the mirrors 3 and 4 are in parallel relation or in what other predetermined relation corresponds to the light image at the cut-off point 8. Should the airspeed of the aircraft change, the shaft 9 will be rotated to rotate the mirror 3. This will move the image of the light source either into the zone where it is cut off by the shield 7 or into the zone where it is directed upon the photoelectric unit 6. When the image of the light source is cut off by the shield 7, the tube 29 will not fire and the motor 35 will rotate in a first direction to vary the resistance of the rheostat 43 in a first direction. This will change the speed of the motor 19 in a first direction and the change in speed of the motor 19 will be accompanied by a rotation of the shaft 15 of the drag cup tachometer 17 to rotate the mirror 4 into parallelism or other predetermined arrangement with the mirror 3.

When the image of the light source is directed upon the photoelectric unit 6, the tube 29 fires so that the motor 35 reverses its direction of rotation as previously described to drive the rheostat 43 in the reverse direction which in turn changes the speed of the motor 19 in the reverse direction. This again changes the response of the drag cup tachometer 17 to return the mirror 4 into parallelism with the mirror 3. In the operation of the follow-up system the motor 35 will be continually "hunting" or rotating in opposite directions to maintain the light ray image at the cut-off point 8 of the photoelectric cell.

Since the speed of rotation of the motor 19 is a function of the response of the true airspeed indicator 11, the number of revolutions of the motor 19 as indicated on the counter 25 integrates the variables speed and time to provide a direct reading on the counter 25 of air miles traveled.

It will, of course, be understood that the optical follow-up system herein specifically disclosed with the air miles recorder is of general application where any follow-up of a movable element is desired.

It will also be understood that while the air miles recorder herein specifically disclosed is utilizing an optical follow-up system, it may incorporate other follow-up systems such as pneumatic, mechanical or electrical; for example that disclosed in the aforesaid application Serial No. 644,136 now Patent No. 2,437,064.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. In an air miles recorder for aircraft, means responsive to airspeed, a first element movable by said airspeed responsive means, a variable speed motor, means responsive to the speed of rotation of said variable speed motor, a second element movable into predetermined relation with said first element by said means responsive to the speed of rotation of said variable speed motor, means controlled by the position of said elements relative to each other for controlling the speed of rotation of said variable speed motor, and indicating means responsive to the revolutions of said variable speed motor for registering the air miles traveled.

2. In an air miles recorder for aircraft, means responsive to airspeed, a first element movable by said airspeed responsive means, a variable speed motor, means responsive to the speed of rotation of said variable speed motor, a second element movable into predetermined relation with said first element by said means responsive to the speed of rotation of said variable speed motor, a reversible motor whose direction of rotation is controlled by the position of said elements relative to each other, means for controlling the speed of said variable speed motor in response to rotation of said reversible motor, and air miles indicating means driven by said variable speed motor.

3. In an air miles recorder for aircraft, means responsive to airspeed, a first element whose position is determined by said airspeed responsive means, a variable speed motor, means responsive to the speed of rotation of said variable speed motor, a second element whose position is determined by said means responsive to the speed of rotation of said variable speed motor, speed control means for said variable speed motor, means controlled by the positioning of said elements relative to each other for operating said speed control means to vary the speed of said motor, and air miles indicating means driven by said motor.

4. In an air miles recorder for aircraft, means responsive to airspeed, a first element whose position is determined by said airspeed responsive means, a variable speed motor, means responsive to the speed of rotation of said variable speed motor, a second element whose position is determined by said means responsive to the speed of rotation of said variable speed motor, speed control means for said variable speed motor, means controlled by the positioning of said elements relative to each other for operating said speed control means to vary the speed of said motor, and means responsive to the revolutions of said motor to integrate speed with time to indicate the air miles traveled.

5. In an air miles recorder for aircraft, means responsive to airspeed, a first element whose position is determined by said airspeed responsive means, a variable speed motor, means responsive to the speed of rotation of said variable speed motor, a second element whose position is determined by said means responsive to the speed of rotation of said variable speed motor, a reversible motor whose direction of rotation is determined by the position of said elements relative to each other, speed control means for said variable speed motor operated by said reversible motor, and a register driven by said variable speed motor for recording the air miles traveled.

6. In an air miles recorder for aircraft, means responsive to air speed, a first element movable by said means responsive to air speed, a variable speed motor, a drag cup tachometer driven by said variable speed motor, a second element movable by said drag cup tachometer, means responsive to the relative position of said elements for controlling the speed of said motor, and means responsive to the revolutions of said motor for recording the air miles traveled.

7. In an air miles recorder for aircraft, means responsive to air speed, a first element movable by said means responsive to air speed, a variable speed motor, a drag cup tachometer driven by said variable speed motor, a second element movable by said drag cup tachometer, speed control means for said variable speed motor, a reversible motor driving said speed control means, means responsive to the relative position of said elements for controlling the direction of rotation of said reversible motor, and means responsive to the revolutions of said variable speed motor for recording the air miles traveled.

8. In an air miles recorder for aircraft, means responsive to airspeed, a variable speed motor, an optical follow-up system including a light source, a light sensitive element and an optical system containing means including a pair of mirrors for directing the light rays from said light source upon the light sensitive element, means for positioning one of said mirrors by said airspeed responsive means, means for positioning the other of said mirrors by the speed of rotation of said variable speed motor, means employing said light source, mirrors and light sensitive elements for controlling the speed of said variable speed motor in response to the position of said light rays relative to the light sensitive element, and means responsive to the revolutions of said variable speed motor for recording the air miles traveled.

9. In an air miles recorder for aircraft, means responsive to airspeed, a variable speed motor, an optical follow-up system including a light source, a light sensitive element, and an optical system containing means including a pair of mirrors for directing the light rays from said light source upon the light sensitive element, means for positioning one of said mirrors by said airspeed responsive means, means for positioning the other of said mirrors by the speed of rotation of said variable speed motor, speed control means for said variable speed motor, a reversible motor operating said speed control means, a control circuit for said reversible motor including said light sensitive element and operated in accordance with the position of the light rays on the light sensitive element to determine the direction of rotation of said reversible motor, the position of said other of said mirrors being varied by variation in the speed of said variable speed motor in response to change in the position of said one of said mirrors by said speed responsive means so as to maintain the light rays at a predetermined point with respect to said light sensitive element, and means responsive to the revolutions of said variable speed motor for recording the air miles traveled.

10. In an air miles recorder for aircraft, means responsive to airspeed, a variable speed motor, an optical follow-up system including a light source, a light sensitive element and an optical system containing means including a pair of mirrors for directing the light rays from said light source upon the light sensitive element, means for positioning one of said mirrors by said airspeed responsive means, means for positioning the other of said mirrors by the speed of rotation of said variable speed motor, means responsive to the position of the light rays relative to the light responsive element for varying the speed of said variable speed motor to move said other of said mirrors to return the light rays to a predetermined point with respect to the light sensitive element after movement of said one of said mirrors, said follow-up being accomplished by movement of the mirrors only while the remainder of the optical system remains stationary, and a counter driven by said variable speed motor for recording the air miles traveled.

11. In an optical follow-up system, an actuated mirror, responsive means for positioning said mirror, a follow-up mirror, a light sensitive element, a light source, the rays from which are reflected from said mirrors to said light sensitive element, a reversible motor means including said light sensitive element by which the direction of rotation of said reversible motor is determined by the energization or de-energization of said light sensitive element by the presence or absence of the light rays thereon, and means for varying the position of said follower mirror in response to the direction of rotation of said reversible motor to return the light rays to said light sensitive element after movement of said actuated mirror.

12. In an optical follow-up system, a light source, a lens for collimating the light rays from said light source, a first mirror upon which the collimated rays are directed, a second mirror to which the light rays reflected from said first mirror are directed, a second lens for focusing the light rays reflected from said second mirror, a light sensitive element spaced from said second lens by its focal length, the relative position of said mirrors determining the impingement of the light rays upon said light sensitive element, and means controlled by the energization and de-energization of said light sensitive element for effecting movement of one of said mirrors in response to movement of the other of said mirrors.

13. In an optical follow-up system, a light source, a lens for collimating the light rays from said light source, a first mirror upon which the collimated rays are directed, a second mirror to which the light rays reflected from said first mirror are directed, a second lens for focusing the light rays reflected from said second mirror, a light sensitive element spaced from said second lens by its focal length, the relative position of said mirrors determining the impingement of the light rays upon said light sensitive element, one of said mirrors being movable in response to an exterior condition to vary the focal point of said light rays with respect to the light sensitive element, and means responsive to energization and de-energization of the light sensitive element for effecting movement of the second mirror as a follower to return the focal point of the light rays to its predetermined position with respect to the light sensitive element, said optical follow-up being effected by movement of the mirrors only while the remaining elements of the optical system remain stationary.

JOHN H. ANDRESEN, Jr.

REFERENCES CITED

The following references are of record in the file of this patent:

UNITED STATES PATENTS

| Number | Name | Date |
| --- | --- | --- |
| 1,897,850 | La Pierre | Feb. 14, 1933 |
| 1,993,527 | Mears et al. | Mar. 5, 1935 |
| 2,216,472 | Harrison | Oct. 1, 1940 |
| 2,269,068 | Corbin | Jan. 6, 1942 |